United States Patent
Sysoev et al.

(10) Patent No.: US 11,042,424 B1
(45) Date of Patent: *Jun. 22, 2021

(54) PIPELINED REQUEST PROCESSING USING SHARED MEMORY

(71) Applicant: F5 Networks, Inc., Seattle, WA (US)

(72) Inventors: Igor Sysoev, Moscow (RU); Valentin Bartenev, Moscow (RU); Nikolay Shadrin, San Francisco, CA (US); Maxim Romanov, Moscow (RU)

(73) Assignee: F5 NETWORKS, INC., Seattle, WA (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/372,086

(22) Filed: Apr. 1, 2019

Related U.S. Application Data (60) Provisional application No. 62/662,167, filed on Apr. 24, 2018.

(51) Int. Cl.
*G06F 9/54* (2006.01)
*G06F 13/16* (2006.01)
(Continued)

(52) U.S. Cl.
CPC ............ *G06F 9/544* (2013.01); *G06F 9/3869* (2013.01); *G06F 9/5005* (2013.01);
(Continued)

(58) Field of Classification Search
CPC ...... G06F 9/544; G06F 9/3869; G06F 9/5005; G06F 13/1663; G06F 2213/16; H04L 67/02
See application file for complete search history.

(56) References Cited

U.S. PATENT DOCUMENTS

| | | |
|---|---|---|
| 4,387,441 A | 6/1983 | Kocol et al. |
| 4,769,771 A | 9/1988 | Lippmann et al. |
| (Continued) | | |

OTHER PUBLICATIONS

Jazayeri, M., Java, In Encyclopedia of Software Engineering, 2002, J. J. Marciniak (ed.), p. 9 (Year: 2002).
(Continued)

*Primary Examiner* — Todd L Barker
(74) *Attorney, Agent, or Firm* — Troutman Pepper Hamilton Sanders LLP (Rochester)

(57) ABSTRACT

Pipelined request processing using shared memory includes writing, by a first process, data associated with a request and an identifier referencing the data to a shared memory segment. The first process transmits, to a second process, the identifier referencing the data. The second process compares the transmitted identifier to the identifier in the shared memory segment. Responsive to the transmitted identifier matching the identifier in the shared memory segment, the second process updates the identifier in the shared memory segment to indicate that the data has been retrieved by the second process. The comparison and update is performed using an atomic compare-and-swap operation. Using the identifiers prevents race conditions between the different processes in trying to access the data. The second process processes the data to generate a response and transmits the response to the first process.

23 Claims, 7 Drawing Sheets

(51) Int. Cl.
  *G06F 9/38* (2018.01)
  *H04L 29/08* (2006.01)
  *G06F 9/50* (2006.01)
(52) U.S. Cl.
  CPC .......... *G06F 13/1663* (2013.01); *H04L 67/02* (2013.01); *G06F 2213/16* (2013.01)

(56) References Cited

U.S. PATENT DOCUMENTS

| | | | |
|---|---|---|---|
| 5,376,752 | A | 12/1994 | Limberis et al. |
| 5,437,031 | A | 7/1995 | Kitami |
| 5,903,627 | A | 5/1999 | Shaffer et al. |
| 5,956,754 | A | 9/1999 | Kimmel |
| 6,085,296 | A | 7/2000 | Karkhanis et al. |
| 6,125,401 | A | 9/2000 | Huras et al. |
| 6,161,169 | A | 12/2000 | Cheng |
| 6,163,801 | A | 12/2000 | O'Donnell et al. |
| 6,735,770 | B1 | 5/2004 | Yeager et al. |
| 6,785,892 | B1 | 8/2004 | Miller et al. |
| 6,839,732 | B1 | 1/2005 | Vincent |
| 7,549,151 | B2 | 6/2009 | Zhou et al. |
| 7,552,440 | B1 | 6/2009 | Stewart et al. |
| 7,653,675 | B2 | 1/2010 | Myers et al. |
| 8,209,403 | B2 | 6/2012 | Szabo et al. |
| 8,281,060 | B2 | 10/2012 | Supalov et al. |
| 9,448,827 | B1 | 9/2016 | Allen |
| 10,506,072 | B2 | 12/2019 | Sysoev |
| 2002/0120724 | A1 | 8/2002 | Kaiser |
| 2002/0138704 | A1* | 9/2002 | Hiser ................. G06F 11/1666 711/162 |
| 2002/0144006 | A1 | 10/2002 | Cranston et al. |
| 2003/0061395 | A1 | 3/2003 | Kingsbury et al. |
| 2003/0097489 | A1 | 5/2003 | Nagarajayya et al. |
| 2003/0101245 | A1 | 5/2003 | Srinivasan |
| 2005/0044551 | A1 | 2/2005 | Sodhi |
| 2005/0091439 | A1 | 4/2005 | Mohideen et al. |
| 2006/0053267 | A1 | 3/2006 | McDonald et al. |
| 2008/0072236 | A1 | 3/2008 | Pope et al. |
| 2008/0155103 | A1 | 6/2008 | Bailey |
| 2008/0270422 | A1 | 10/2008 | Craft |
| 2008/0270829 | A1 | 10/2008 | Craft |
| 2010/0030975 | A1 | 2/2010 | Murray et al. |
| 2010/0082816 | A1 | 4/2010 | Kharat |
| 2011/0314238 | A1 | 12/2011 | Finkler |
| 2013/0117761 | A1 | 5/2013 | Archer |
| 2013/0219057 | A1 | 8/2013 | Li et al. |
| 2014/0289725 | A1 | 9/2014 | Velayutham |
| 2015/0149736 | A1* | 5/2015 | Kwon ................... G06F 3/0673 711/147 |
| 2015/0186192 | A1 | 7/2015 | Dyakin et al. |
| 2016/0043897 | A1* | 2/2016 | Xing .................. H04L 41/0859 709/223 |
| 2017/0371810 | A1* | 12/2017 | Xia ..................... H04L 49/9094 |
| 2018/0007162 | A1 | 1/2018 | Olmsted-Thompson |
| 2018/0074842 | A1 | 3/2018 | Fu |
| 2019/0026195 | A1* | 1/2019 | Chen ................... G06F 11/1441 |
| 2019/0073316 | A1* | 3/2019 | Sysoev ............... G06F 12/1009 |
| 2019/0075024 | A1 | 3/2019 | Sysoev |

OTHER PUBLICATIONS

"Announcing NGINX Plus R15" retrieved from internet: https://www.nginx.com/blog/nginx-plus-r15-released/?_ga=2.151600313.1097175886.1565964481-211803805.1565964481, (Apr. 10, 2018).
"Controlling nginx", retrieved from the internet: https://nginx.org/en/docs/control/.html (Nov. 20, 2011).
"Envoy Proxy—Home," 2017, 5 pages (Retrieved from the Internet Mar. 12, 2018) URL:http://lyft.github.io/envoy/docs/>.
"Use Volumes/Docker Documentation," Docker Inc., 2018, 10 pages (Retrieved from the Internet Mar. 12, 2018) URL: https://docs.docker.com/engine/admin/volumes/volumes/>.
Mouat, A., "Understanding Volumes in Docker," Dec. 9, 2014, 20 pages (Retrieved from Internet Mar. 12, 2018) URL:http://container-solutions.com/understanding-volumes-docker/>.

\* cited by examiner

PIPELINED REQUEST PROCESSING USING SHARED MEMORY

CROSS-REFERENCE TO RELATED APPLICATIONS

This application claims the benefit of U.S. Patent Application No. 62/662,167, filed Apr. 24, 2018, which is incorporated by reference herein.

BACKGROUND

1. Field of the Invention

This invention pertains in general to web server architectures and in particular to processing requests within a web server.

2. Description of the Related Art

In a traditional web server architecture, different processes accept, supervise, and process web requests. The requests are associated with data, such as contents of web pages, files, images, etc., that need to be transported and processed by different processes. A sending process may send data to be processed to a receiving process. After the receiving process has completed processing the data, it may sit idle waiting for new data from the sending process.

The sending process may transmit a queue of new data in a look-ahead manner to the receiving process such that new data is available to the receiving process when it has completed processing previous data. However, the receiving process may take too long for processing the previous data, leading to delays in processing of new data in the queue. Meanwhile, other receiving processes may have completed processing other assigned data and may incur idle time. If the sending process attempts to reassign data in a queue to another receiving process, two receiving processes may access the data simultaneously, leading to race conditions. Therefore, the performance of the web server is impacted due to inefficient assignment of data to processes and race conditions.

SUMMARY

The above and other needs are met by methods, computer-readable storage media, and systems for dynamically sharing data from a first process to a second process.

One aspect provides a computer-implemented method for pipelined request processing using shared memory by writing, by a first process, data associated with a request and an identifier referencing the data to a shared memory segment. The first process transmits, to a second process, the identifier referencing the data. The second process compares the transmitted identifier to the identifier in the shared memory segment. Responsive to the transmitted identifier matching the identifier in the shared memory segment, the second process updates the identifier in the shared memory segment to indicate that the data has been retrieved by the second process. The comparison and update is performed using an atomic compare-and-swap operation. Using the identifiers prevents race conditions between the different processes in trying to access the data. The second process processes the data to generate a response and transmits the response to the first process.

Another aspect provides a non-transitory computer-readable storage medium storing executable computer program instructions for pipelined request processing using shared memory. The computer program instructions write, by a first process, data associated with a request and an identifier referencing the data to a shared memory segment. The first process transmits, to a second process, the identifier referencing the data. The second process compares the transmitted identifier to the identifier in the shared memory segment. Responsive to the transmitted identifier matching the identifier in the shared memory segment, the second process updates the identifier in the shared memory segment to indicate that the data has been retrieved by the second process. The comparison and update is performed using an atomic compare-and-swap operation. Using the identifiers prevents race conditions between the different processes in trying to access the data. The second process processes the data to generate a response and transmits the response to the first process.

Still another aspect provides a system for pipelined request processing using shared memory. The system includes a computer processor and a non-transitory computer-readable storage medium storing executable computer program instructions that when executed by the computer processor perform actions including writing, by a first process, data associated with a request and an identifier referencing the data to a shared memory segment. The first process transmits, to a second process, the identifier referencing the data. The second process compares the transmitted identifier to the identifier in the shared memory segment. Responsive to the transmitted identifier matching the identifier in the shared memory segment, the second process updates the identifier in the shared memory segment to indicate that the data has been retrieved by the second process. The comparison and update is performed using an atomic compare-and-swap operation. Using the identifiers prevents race conditions between the different processes in trying to access the data. The second process processes the data to generate a response and transmits the response to the first process.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a high-level block diagram of a computing environment supporting pipelined request processing using shared memory, according to one embodiment.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
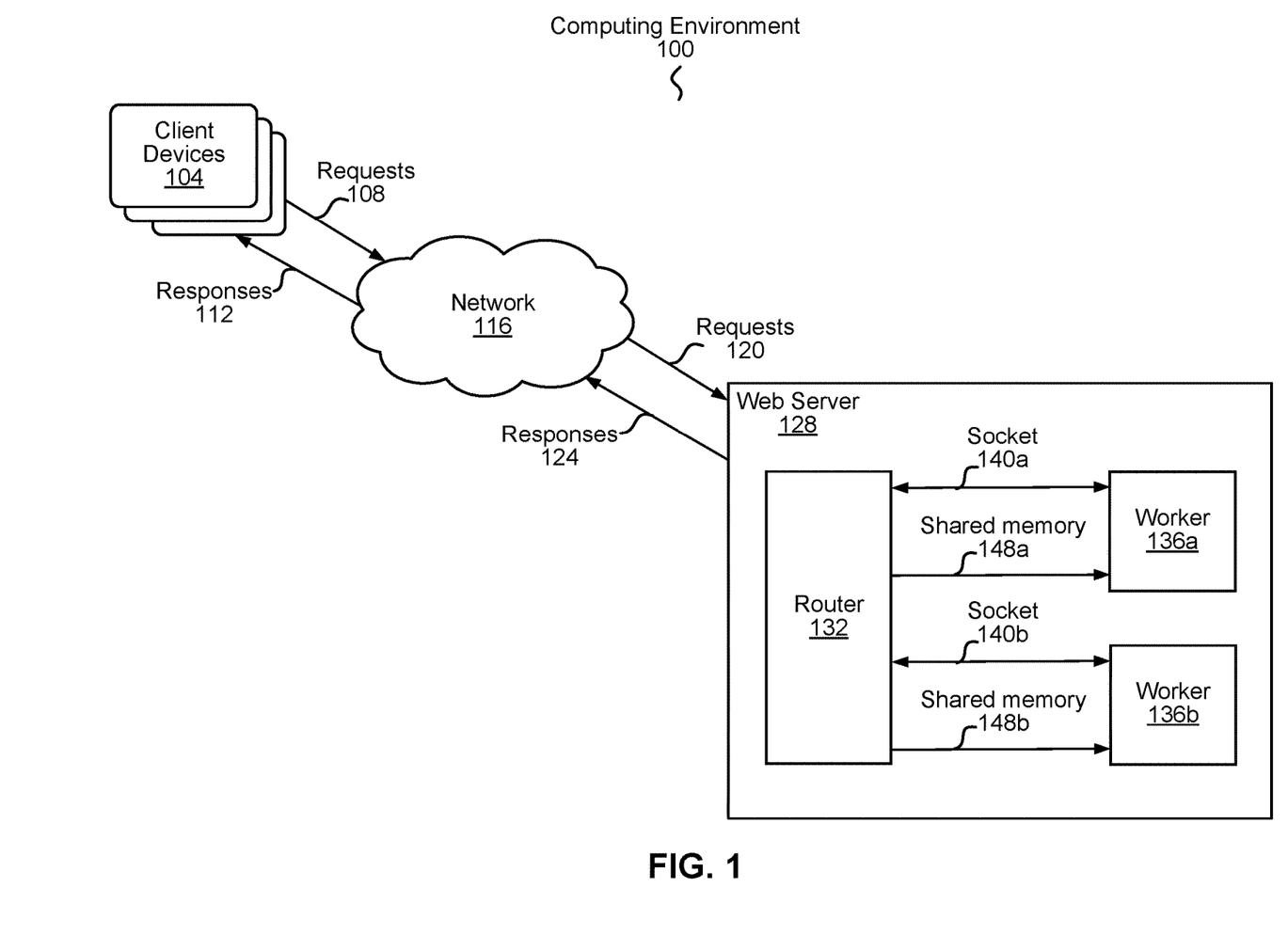

Computing Environment Supporting Pipelined Request Processing Using Shared Memory FIG. 1 is a high-level block diagram of a computing environment 100 supporting pipelined request processing using shared memory, according to one embodiment. FIG. 1 illustrates multiple client devices 104 and a web server 128 connected by a network 116. While only a few client devices 104 and one web server are shown in FIG. 1, embodiments of the computing environment 100 can have many such entities connected to the network.

FIG. 1 uses like reference numerals to identify like elements. A letter after a reference numeral, such as "140a," indicates that the text refers specifically to the element having that particular reference numeral. A reference numeral in the text without a following letter, such as "140," refers to any or all of the elements in the figures bearing that reference numeral. For example, "140" in the text refers to reference numerals "140a" and/or "140b" in the figures.

A client device 104 is an electronic device used by a user to perform functions such as consuming digital content, executing software applications, browsing web sites hosted by or otherwise interacting with the web server 128 on the network 116, and downloading files. For example, the client device 104 may be a smartphone or a tablet, notebook, or desktop computer. In addition, the client device 104 may be an Internet-of-Things (IoT)-connected device such as a home appliance, or even another web server. The client device 104 may include a display device on which the user may view digital content stored on the client device 104 or downloaded from the web server 128. In addition, the client device 104 may include a user interface (UI), such as physical and/or on-screen buttons, with which the user may interact to perform functions such as consuming digital content, obtaining digital content, and transmitting digital content.

A client device 104 sends requests 108 to the web server 128 via the network 116. A request 108 seeks to access a resource maintained, controlled, or otherwise accessible by the web server 128. In one embodiment, the client device 104 sends the request 108 using the Hypertext Transfer Protocol (HTTP) or a secure variant thereof. For example, a web browser on the client device 104 may send a request 108 to the web server 128 to process data (e.g., data related to a web page or an image). The request 108 includes information identifying the data to be processed, the client device 104, the server 128, and the session.

The network 116 enables communications among the client devices 104 and the web server 128. To this end, the network 116 receives requests 108 and corresponding data (e.g., data related to a web page or an image) from client devices 104 and forwards the requests 120 to the web server 128. Likewise, the network 116 receives responses 124 and corresponding data (e.g., results of the processing to be downloaded from a web page) from the web server 128 and forwards the responses 112 to the client devices 104.

The network 116 can comprise the Internet as well as mobile telephone networks. In one embodiment, the network 116 uses standard communications technologies and/or protocols. Thus, the network 116 can include links using technologies such as Ethernet, 802.11, Long-Term Evolution (LTE), etc. The networking protocols used on the network 116 can include multiprotocol label switching (MPLS), the transmission control protocol/Internet protocol (TCP/IP), the User Datagram Protocol (UDP), HTTP, the simple mail transfer protocol (SMTP), the file transfer protocol (FTP), etc. The data exchanged over the network 116 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The web server 128 receives and processes requests 120 (including data) from the client devices 104 and sends responses 124 back to the requesting client devices 104. As mentioned above, the requests 120 received by the web server 128 are typically associated with data. For a given request 120, the web server 128 may also obtain a requested data resource, process the data, and send a response 124 providing the processed data back to the requesting client device 104. The data resource is typically a file or other data, such as a web page or component thereof. Requests 120 received by the web server 128 are processed by one or more router modules 132. In one embodiment, the router module 132 is a process that analyzes the requests 120 and routes the requests 120 to one or more workers (e.g., 136a, 136b) for processing. The workers 136 may be processes and/or threads executing within a process space. There may be multiple router modules 132 operating concurrently in order to support load balancing and other features. Upon processing the requests, the workers 136 send responses and data back to the router module 132.

The router module 132 and workers 136 use shared memory segments 148 to share data related to the requests and responses generated therefrom. Each shared memory segment 148 is capable of bidirectional communication between two or more processes. In one embodiment, each shared memory segment 148 is used for unidirectional communication from one source process to one destination process. For example, the router module 132 uses the dedicated shared memory segment 148a for communicating data to the worker 136a. In addition, the router module 132 and worker 136a use a dedicated bidirectional socket 140a to send control messages about the shared memory segment 148a. The socket 140a effectively serves as a control channel using which the router module 132 and worker 136a can exchange control messages about the shared memory segment 148a. Similarly, the router module 132 uses the dedicated shared memory segment 148b for communicating data to the worker 136b. In addition, the router module 132 and worker 136b use a dedicated bidirectional socket 140b to send control messages about the shared memory segment 148b. Using shared memory segments 148 in this way allows the router module 132 and workers 136a and 136b to reduce handshaking and locking operations and more efficiently share data related to requests and responses.

The shared memory segments 148 and sockets 140 may be used for pipelined processing of application service requests 120 in the web server 128. The router may use the shared memory segments 148 to assign a queue of multiple requests 120 to each worker 136 in a look-ahead manner. Each worker 136 sequentially processes the requests in its queue based on receiving control messages related to each request from the router module 132. Each control message includes an identifier referencing data in a shared memory segment to be processed for the request. Therefore, a worker 136 does not need to wait for the router module 132 to transmit new data to the worker when the worker is ready to process a request.

The pipelined processing of requests 120 is achieved using identifiers referencing the data for each request. A sharing entity (e.g., router module 132) can write data and an identifier referencing the data to the shared memory segment 148a. The router module 132 transmits to the worker 136a, over the socket 140a, the identifier referencing the same data. The identifier transmitted to the worker 136a is identical to the identifier written to the shared memory segment 148a for the chunk. The worker 136a compares the transmitted identifier to the identifier in the shared memory segment 148a. Responsive to the transmitted identifier matching the identifier in the shared memory segment 148a, the worker 136a updates the identifier in the shared memory segment 148a to indicate that the data has been retrieved. The worker 136a retrieves the data from the shared memory segment 148a and processes the data to generate a response. The worker 136a transmits the response to the first process.

The comparing of the transmitted identifier to the identifier in the shared memory segment 148a and the updating of the identifier in the shared memory segment 148a to indicate that the data has been retrieved is performed as a single atomic operation. In one embodiment, a "compare-and-swap" operation is used to perform the comparing and updating of the identifier in the shared memory segment 148a. The compare-and-swap operation prevents race conditions between two processes trying to access the same data at the same time. Hence, the worker 136b is prevented from retrieving the data in the shared memory segment 148a while the worker 136a is comparing and updating the identifier in the shared memory segment 148a.

Moreover, the router 132 can use the shared memory segments 148, identifiers, and sockets 140 to reassign a request from one worker (e.g., 136a) to another (e.g., 136b) to reduce latency and improve load-balancing. If the router 132 decides to reassign the data stored in shared memory segment 148a to worker 136b before worker 136a has retrieved the data, the router module may itself compare the transmitted identifier to the identifier in the shared memory segment 148a and update the identifier in the shared memory segment 148a if the transmitted identifier matches the identifier in the shared memory segment 148a. The router module 132 can perform the comparing and updating of the stored identifier using the compare-and-swap operation to determine whether the worker 136a has begun processing the data and to indicate that the data has been reassigned. The comparing and updating prevents race conditions between the worker 136a trying to access the data while the router module 132 is trying to reassign it.

This technique avoids delays in processing of data by avoiding the creation of bottlenecks that may stall processing of new data in a queue. In addition, this technique provides load-balancing of requests by reassigning requests to lightly loaded processes. By improving the distribution of workloads across multiple processes, this technique increases resource utilization and throughput, and reduces response time and overload of any single process. While this description refers to using shared memory segments between a router module 132 and workers 136a and 136b, the techniques described herein can be used to share and reassign data between any set of processes.

Shared Memory Server Architecture Supporting Pipelined Request Processing

Figure 2:
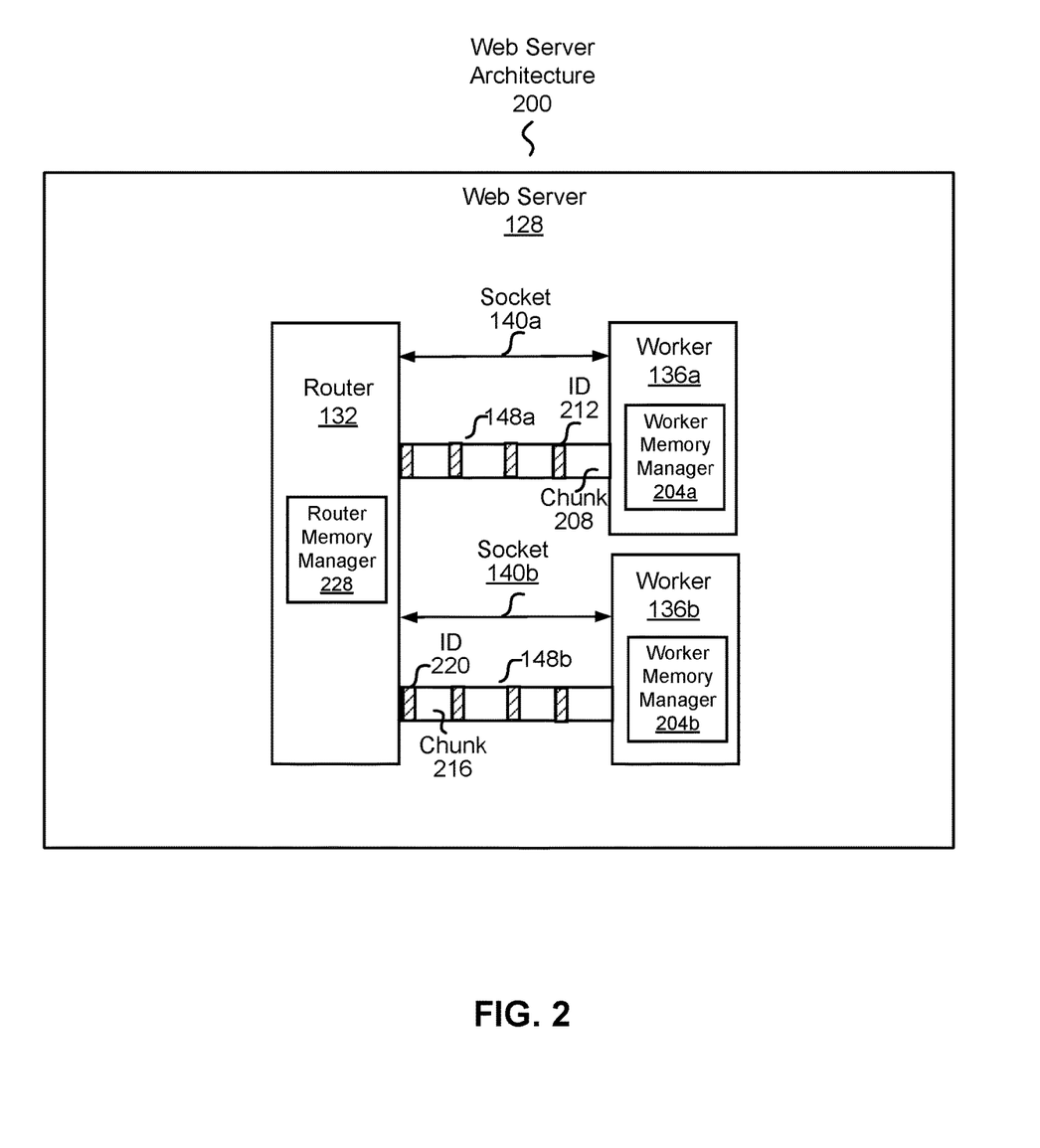
FIG. 2 is a high-level block diagram illustrating a more detailed view of the architecture of the web server of FIG. 1, according to one embodiment.

FIG. 2 is a high-level block diagram illustrating a more detailed view of the architecture 200 of the web server 128 of FIG. 1, according to one embodiment. FIG. 2 illustrates the router module 132 and workers 136a and 136b of FIG. 1. In addition, FIG. 2 illustrates the sockets 140a, 140b and the shared memory segments 148a, 148b. The router module 132 includes a router memory manager 228. The workers 136a, 136b include the worker memory managers 204a, 204b. Other embodiments of the web server 128 can have different and/or other modules than the ones described here, and the functionalities can be distributed among the modules in a different manner.

As discussed earlier, the router module 132 supervises processing of requests from the client devices 104. When an inbound request 120 with its corresponding data reaches the web server 128, it is passed to the router module 132. The router module 132 analyzes the request 120 and may route the request 120 and its corresponding data to worker 136a. To transmit the data for processing to worker 136a, the router 132 writes the data to one or more chunks (e.g., chunk 208) of the shared memory segment 148a. The shared memory segment 148a is portioned in a set of discrete chunks, with each chunk (e.g., chunk 208) holding a fixed amount of memory. In one embodiment, a shared memory segment 148a is partitioned into multiple chunks that are evenly-sized. For example, if the shared memory segment 148a is one megabyte in size, it may be formed of eight 128 KB chunks. Alternatively, some or all of the chunks may be of different sizes.

Each chunk (e.g., chunk 208) in a shared memory segment (e.g., 148a) is associated with an identifier (e.g., ID 212), i.e., there is one identifier per chunk. The identifier 212 stores state information about the data in the chunk 208. In one embodiment, the identifier 212 may be a binary value that indicates whether the request associated with the data in the chunk 208 is valid. A valid request is one which should be processed by the worker 136a. An invalid request is one which should not be processed by the worker 136a. In another embodiment, the identifier 212 may be a multi-bit value that indicates validity and may also indicate additional state information about the request associated with the data in the chunk 208. For example, the identifier 212 may indicate whether the data in the chunk 208 is ready to be retrieved, whether the data has already been retrieved by a worker (e.g., 136a), whether the data has been reassigned by the router module 132 to another worker (e.g., 136b), or whether the data in a chunk has been abandoned by the router 132. In another embodiment, the identifiers (e.g., 212) may be stored as a bitmap with each bit associated with a chunk of the shared memory segment 148a and having a value indicating the status of the data as described above. Other embodiments may represent the stored identifiers using other techniques, such as via a linked list.

The router memory manager 228 and worker memory managers 204a, 204b pass control messages about the data in the shared memory segments 148a, 148b via the sockets 140a, 140b. A control message may indicate, for example, that a shared memory segment 148a has been created or that shared data has been placed in a particular chunk 208 of a shared memory segment 148a. A control message transmitted by the router module 132 may additionally contain an identifier referencing data in a chunk 208 and instruct a worker 136a to perform a particular function with respect to the data in the chunk 208, such as processing the data or updating a stored identifier 212 associated with the chunk 208 in the shared memory segment 148a to indicate that the shared data has been consumed by the worker 136a.

Each of the worker memory managers 204a, 204b may compare the identifier transmitted by the router module 132 with a stored identifier (e.g., 212) associated with the chunk storing the data. If the identifiers match, the worker memory manager (e.g., 204a) updates the stored identifier 212 to signal that the data in chunk 208 has been retrieved. Responsive to the transmitted identifier not matching the identifier 212 in the shared memory segment 148a, the worker memory manager 204a terminates the retrieving of the data in the chunk 208. The comparing and updating is a single atomic operation that prevents race conditions between the worker memory manager 204a and another worker memory manager 204b trying to access the same data in chunk 208. In one embodiment, the comparing and updating may be performed using an atomic compare-and-swap operation.

The router memory manager 228 and worker memory manager 204a may also perform the comparing and updating of the stored identifier 212 to prevent race conditions from occurring when the router module 132 has decided to reassign a request associated with the data to another worker 136b for processing. For example, the router memory manager 228 may write data associated with a request to chunk 208 and an identifier 212 referencing the data to the shared memory segment 148a. The router module 132 transmits a control message including an identifier referencing the data to the worker 136a, instructing the worker 136a to process the data. The identifier transmitted to the worker 136 is identical to the identifier 212 written to the shared memory segment 148a for the chunk. The router module 132 may then decide to reassign the request associated with the data in the chunk 208 to another worker 136b for processing. However, a race condition could potentially occur if the worker 136a were to access the data in chunk 208 while the router module 132 is trying to reassign the request. Hence to prevent the race condition, before reassigning the request, the router module 132 compares the transmitted identifier to the identifier 212 stored in the shared memory segment 148a. If the identifiers match, the router module 132 updates the stored identifier 212 to signal that the data in chunk 208 has been reassigned.

Similar to the description above, the comparing and updating is a single atomic operation that prevents race conditions between the router module 132 and the worker memory manager 204a trying to access the same data in chunk 208. Responsive to the transmitted identifier not matching the identifier 212 in the shared memory segment 148a, the router module 132 terminates the reassigning of the data in the chunk 208. In one embodiment, the comparing and updating is performed using an atomic compare-and-swap operation.

Router Memory Manager Supporting Pipelined Request Processing

Figure 3A:
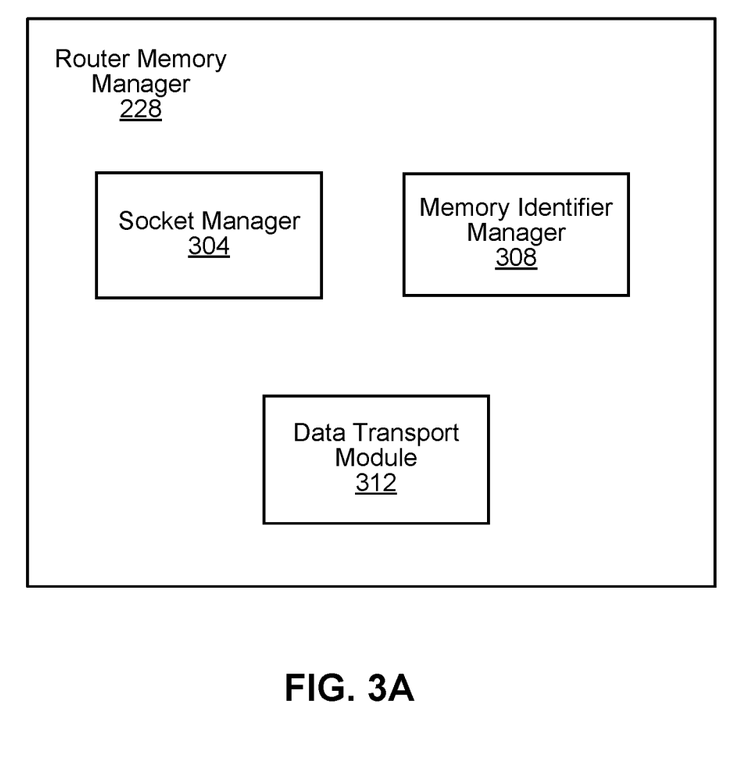
FIG. 3A is a high-level block diagram illustrating components of a router memory manager according to one embodiment.

FIG. 3A is a high-level block diagram illustrating components of a router memory manager 228 according to one embodiment. FIG. 3A illustrates that the router memory manager 228 includes a socket manager 304, a memory identifier manager 308, and a data transport module 312. Other embodiments of the router memory manager 228 can have different and/or other modules than the ones described here, and the functionalities can be distributed among the modules in a different manner.

The socket manager 304 performs socket-based communications for the router memory manager 228. These communications include transmitting control messages to the worker memory managers 204a, 204b and receiving control messages from the worker memory managers 204a, 204b. Depending upon the embodiment, the socket manager 304 may establish and use a persistent pair of sockets for communications, or may open a socket on demand when necessary to send a control message, and then close the socket after sending the message.

The socket manager 304 may transmit a control message to the worker 136a over socket 140a instructing the worker 136a that data for processing by worker 136a has been written to one or more chunks (e.g., chunk 208) in shared memory segment 148a. The transmitted control message may contain a file descriptor referencing the shared memory segment 148a and identifying the chunk 208. The transmitted control message may also contain an identifier referencing the status of the data. For example, the identifier may be an integer in hexadecimal format or a reference to an entry in a bitmap. If the router 132 decides to reassign the data previously written to the shared memory segment 148a to another worker 136b, the socket manager 304 may transmit a control message to the worker 136a over socket 140a instructing the worker 136a that the data previously written to chunk 208 has been reassigned to another worker.

The memory identifier manager 308 determines whether the router module 132 should reassign a request from one worker 136a to another worker 136b. The router module 132 may write data associated with the request and an identifier 212 referencing the data to a shared memory segment 148a. The socket manager 304 instructs the worker 136a via a control message (including an identifier referencing the data) to process the data. The identifier transmitted to the worker 136a is identical to the identifier 212 written to the shared memory segment 148a for the chunk. The router module 132 may then determine that the data should be abandoned or reassigned to worker 136b instead. The router 132 may make the determination to reassign the data under one of several conditions. For example, the router 132 may decide to reassign the data if a certain maximum time interval has passed and the router has not yet received a response or control message from worker 136a indicating that worker 136a has begun processing the data. In another example, the router 132 may monitor the average time for processing a chunk of data or a task across all the workers. The router 132 may decide to reassign the data if the worker 136a has taken longer than this average time to send a response or a control message to the router 132 indicating that the worker 136a has begun processing the data. The client device 104 or another entity might terminate the web connection associated with the data, e.g., if the client 104 disconnects from the web server 128. In this event, the router may decide to abandon the task associated with the data and free up the chunk 212 that the data was written to. The router 132 may also decide to abandon the task associated with the data and free up the chunk 212 if the router 132 receives an interrupt signaling that a higher priority task must be processed.

When the router module 132 wants to reassign a request, the memory identifier manager 308 checks the identifier 212 to determine whether the worker 136a has retrieved and begun processing the data in a chunk 208 associated with the request. The memory identifier manager 308 compares the identifier 212 with the identifier transmitted to the worker 136*a*. If the identifiers match, the memory identifier manager 308 updates the identifier 212 indicating that the data is being reassigned and that no other worker should retrieve it. In one embodiment, the comparing and updating is performed by an atomic compare-and-swap operation on the identifier 212 to prevent race conditions with the worker 136*a* attempting to retrieve the data.

After the router module 132 has reassigned data in a chunk 208 associated with a request to worker 136*b*, worker 136*a* might still try to access and retrieve the data. Before retrieving the data from chunk 208, the worker 136*a* compares the received identifier (from the control message sent by router module 132) to the identifier 212 associated with chunk 208. Since the identifier 212 has since been updated by the router module 132, it will not match the received identifier. The worker 136*a* may then free up the memory associated with chunk 208 such that new data can be written to the chunk 208 or the worker 136*a* may transmit a control message to the router module 132 instructing it to free up the memory associated with chunk 208.

The data transport module 312 transports data using shared memory segments 148. In one embodiment, the data transport module 312 writes data to one or more chunks (e.g., 208) of one or more shared memory segments (e.g., 148*a*). The data transport module 312 also writes an identifier 212 associated with the chunk 208 to the shared memory segment 148*a*. If the data are reassigned to worker 136*b*, the data transport module 312 may write the data to one or more chunks (e.g., chunk 216) of the shared memory segment 148*b*. The data transport module 312 also writes an identifier 220 associated with the chunk 216 to the shared memory segment 148*b*. The router 132 transmits a control message to the worker 136*b* instructing the worker 136*b* that the data has been written for processing by the worker 136*b*.

Worker Memory Manager Supporting Pipelined Request Processing

Figure 3B:
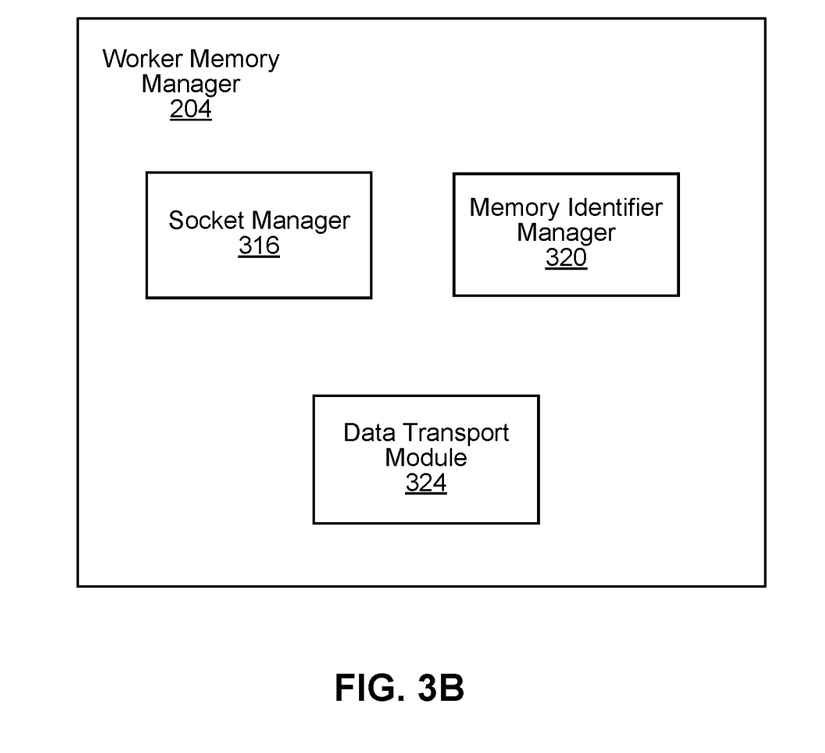
FIG. 3B is a high-level block diagram illustrating components of a worker memory manager according to one embodiment.

FIG. 3B is a high-level block diagram illustrating components of a worker memory manager 204 according to one embodiment. FIG. 3B illustrates that the worker memory manager 204 includes a socket manager 316, a memory identifier manager 320, and a data transport module 324. Other embodiments of the worker memory manager 204 can have different and/or other modules than the ones described here, and the functionalities can be distributed among the modules in a different manner.

The socket manager 316 performs socket-based communications for the worker memory manager 204. These communications include transmitting control messages to the router 132 and receiving control messages from the router 132. For example, the socket manager 316 may transmit a control message to the router 132 over a socket 140 informing the router 132 that it has retrieved data for processing from one or more chunks (e.g., chunk 208) in a shared memory segment 148. After processing the data, the socket manager 316 may transmit a control message to the router 132 over socket 140 informing the router 132 that it has processed the data. The socket manager 316 may also transmit a control message to the router 132 over socket 140 informing the router 132 that response data has been written to a shared memory segment for the router 132 to read from. The socket manager 316 also receives control messages from the router 132 including identifiers referencing data for processing data written to the shared memory segment 148 by the router 132.

The memory identifier manager 320 checks the identifier (e.g., 212) referencing data written by the router 132 to determine whether the data may be retrieved. For example, after a worker 136 receives a control message including an identifier referencing data from the router 132, the memory identifier manager 320 compares the identifier in the control message to the identifier 212 associated with the chunk 208 containing the data. If the identifiers match, the memory identifier manager 320 updates the identifier 212 to indicate that the data has been retrieved. In one embodiment, the comparing and updating is performed by an atomic compare-and-swap operation to prevent potential race conditions with the router 132 trying to abandon or reassign the data and other workers trying to retrieve the data. If the identifiers do not match, the memory identifier manager 320 terminates attempts by the worker 136 to retrieve the data from the shared memory segment 148.

The data transport module 324 retrieves data using shared memory segments. In one embodiment, if the identifiers indicate that the status of the data in the chunk is valid, the data transport module 324 may read data written to a chunk (e.g., 208) of a memory segment 148. As described above, the worker 136 may then transmit a control message to the router 132 informing the router 132 that the data has been read. The router 132 may then free up the chunk 208 for reuse.

Figure 4A:
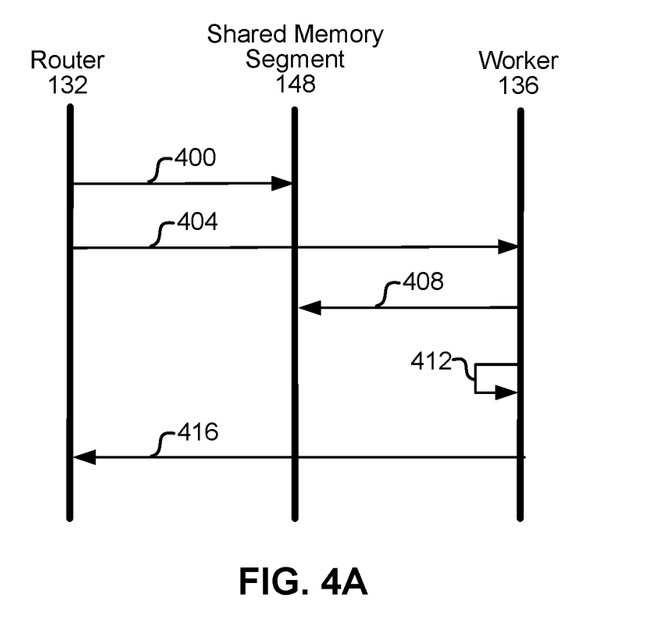
FIG. 4A illustrates interactions between processes in a server architecture for processing requests using shared memory, according to one embodiment.

Interactions Between Processes for Pipelined Request Processing Using Shared Memory FIG. 4A illustrates interactions between processes in a server architecture for processing requests using shared memory, according to one embodiment. The interactions of FIG. 4A may be performed by the router memory manager 228 and worker memory manager 204. Some or all of the interactions may be also performed by other entities. Likewise, the router memory manager 228 and worker memory manager 204 may perform the interactions in different orders, and/or perform different or additional interactions.

Assume for purposes of FIG. 4A that data are shared from a first process (e.g., the router module 132) to a second process (e.g., a worker 136). In one embodiment, a shared memory segment 148 is created and used to share the data. The router 132 writes 400 the data and an identifier 212 referencing the data to the shared memory segment 148. The data may be written to a chunk (e.g., chunk 208) of the shared memory segment 148 and the identifier 212 is associated with the chunk 208. The router 132 transmits 404, to the worker 136, a control message including the identifier referencing data in the chunk 208. The identifier transmitted to the worker 136 is identical to the identifier 212 written to the shared memory segment 148 for the chunk.

The worker 136 compares 408 the identifier in the control message to the identifier 212 written to the shared memory segment 148. Responsive to the identifier in the control message matching the identifier 212, the worker 136 updates the identifier 212 in the shared memory segment 148 to indicate that the data has been retrieved. Responsive to the identifier in the control message not matching the identifier 212, the worker 136 may free up the memory associated with the chunk 208 or transmit a control message to the router module 132 instructing the router module 132 to free up the memory.

The worker 136 retrieves 412 the data from the shared memory segment 148 for processing. The worker 136 transmits 416 a control message over socket 140 to the router 132 that the data has been read and that the worker 136 is processing the data. The steps described above can also be performed by the worker 136 in order to share data from the worker 136 to the router 132.

Interactions Between Processes for Reassigning Requests Using Shared Memory

Figure 4B:
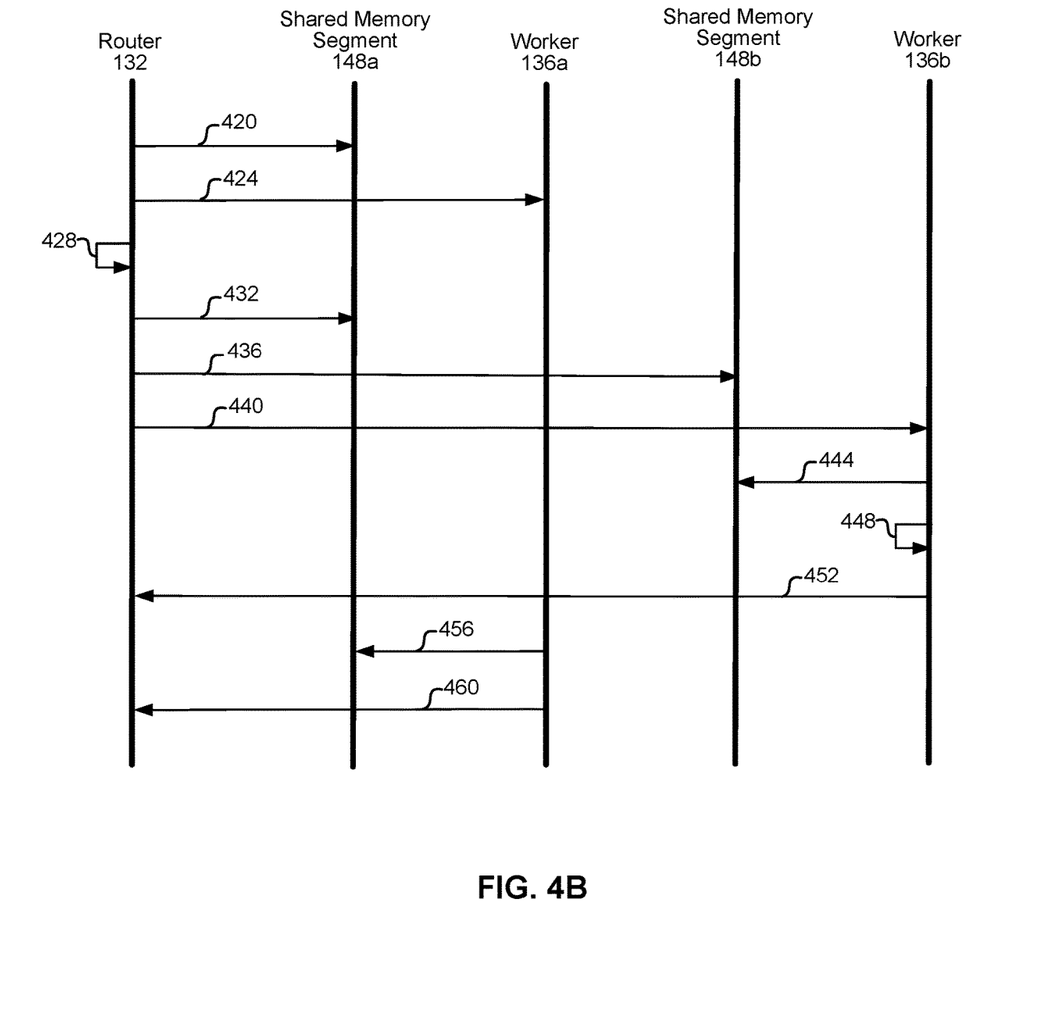
FIG. 4B illustrates interactions between processes in a server architecture for reassigning requests using shared memory, according to one embodiment.

FIG. 4B illustrates interactions between processes in a server architecture for reassigning requests using shared memory, according to one embodiment. The interactions of FIG. 4B may be performed by the router memory manager 228 and worker memory managers 204a, 204b. Some or all of the interactions may be also performed by other entities. Likewise, the router memory manager 228 and worker memory managers 204a, 204b may perform the interactions in different orders, and/or perform different or additional interactions.

Assume for purposes of FIG. 4B that data are shared from a first process (e.g., the router module 132) to second processes (e.g., workers 136a, 136b). In one embodiment, the shared memory segments 148a, 148b are created and used to share the data. The router 132 writes 420 the data and an identifier 212 referencing the data to the shared memory segment 148a of worker 136a. The data may be written to a chunk (e.g., chunk 208) of the shared memory segment 148a and the identifier 212 is associated with the chunk 208. The router 132 transmits 424, to the worker 136a, a control message including an identifier referencing the data. The identifier in the control message is identical to the identifier 212.

The router determines 428 to reassign the data to the worker 136b. This may happen, for example, if a certain maximum time interval has passed or the average time for processing a chunk of data or a task across all the workers has been exceeded and the router 132 has not yet received a response or control message from worker 136a indicating that worker 136a has begun processing the data.

Before reassigning the data, the router 132 compares 432 the identifier (originally identical to the identifier 212) that was sent in the control message to worker 136a to the present value of identifier 212 in the shared memory segment 148a. Responsive to the identifier sent in the control message matching the identifier 212, the router 132 updates the identifier 212 in the shared memory segment 148a to indicate that the data has been reassigned. The process used by the router 132 to mark the data as abandoned (instead of reassigned) is the same. In one embodiment, the comparing and updating is performed as a single atomic compare-and-swap operation to prevent race conditions.

The router 132 writes 436 the data and an identifier 220 referencing the data to the shared memory segment 148b. The data may be written to one or more chunks (e.g., chunk 216) of the shared memory segment 148b and the identifier 220 is associated with the chunk 216. The router 132 transmits 440, to the worker 136b, a control message including an identifier referencing the data. The identifier in the control message transmitted by the router 132 to the worker 136b is identical to the identifier 220.

The worker 136b compares 444 the identifier in the control message to the identifier 220 written to the shared memory segment 148b. Responsive to the identifier in the control message matching the identifier 220, the worker 136b updates the identifier 220 in the shared memory segment 148b to indicate that the data has been retrieved. The worker 136b retrieves 448 the data from the shared memory segment 148b for processing. The worker 136b transmits 452 a control message over socket 140b to the router 132 that the data has been read and that the worker 136b is processing the data.

Once the worker 136a completes processing its previous tasks, the worker 136a compares 456 the identifier referencing the data in the control message it received from the router 132 to the identifier 212 written to the shared memory segment 148a. Responsive to the identifier in the control message not matching the identifier 212 (since the router 132 updated the identifier 212), the worker 136a ignores the data in chunk 208 of the shared memory segment 148a and terminates its attempt to retrieve the data. The worker 136a transmits 460 a control message over socket 140a to the router 132 that the data is being ignored and that the chunk 208 may be reused to write new data. The steps described above can also be performed by the worker 136 in order to share data from the worker 136 to the router 132.

Example Machine Supporting Pipelined Request Processing Using Shared Memory

Figure 5:
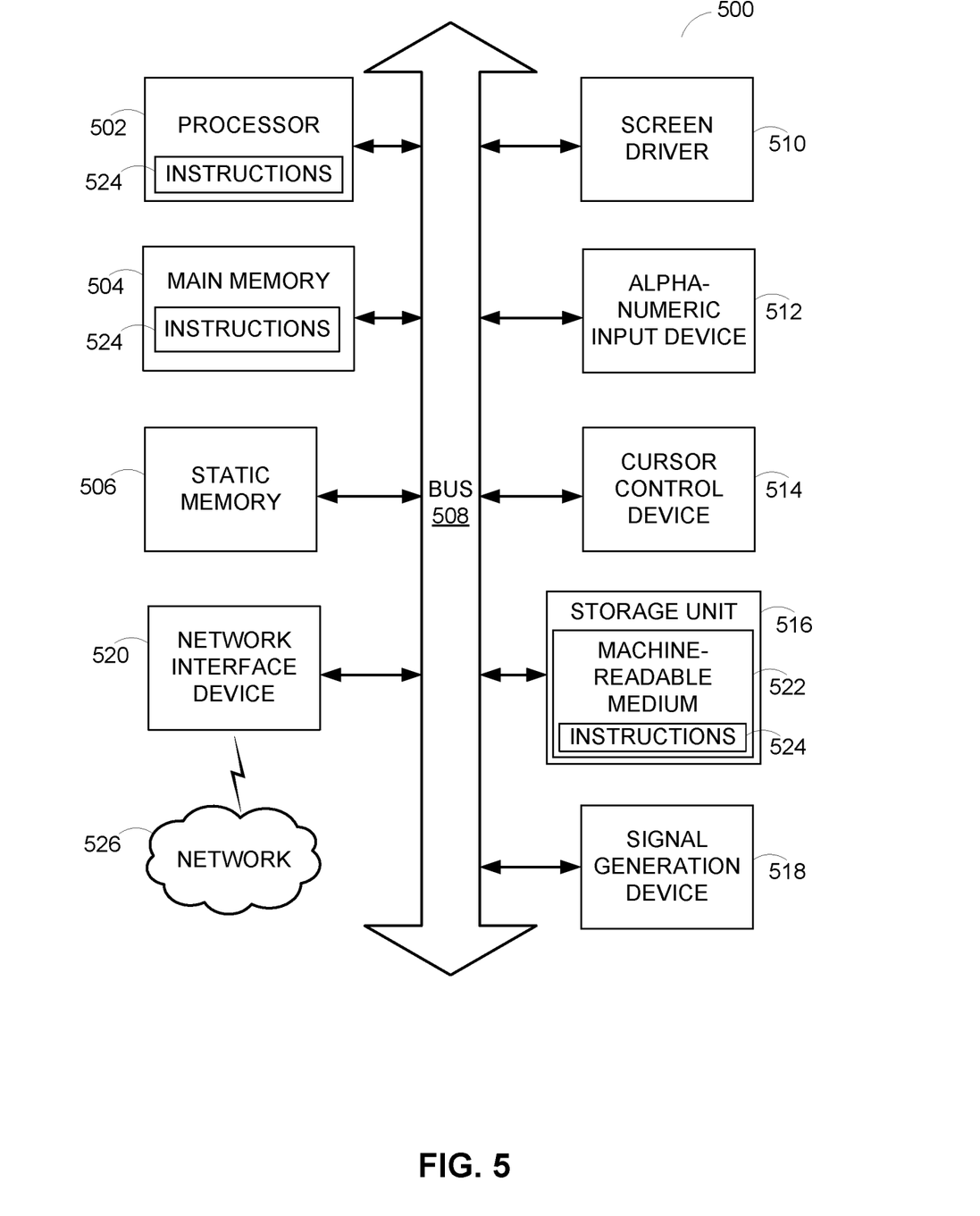
FIG. 5 illustrates components of an example machine able to read instructions to perform pipelined request processing using shared memory in a server architecture, according to one embodiment.

FIG. 5 illustrates components of an example machine 500 able to read instructions to support pipelined request processing using shared memory, according to one embodiment. Those of skill in the art will recognize that other embodiments of the machine 500 can have different and/or other modules than the ones described here, and that the functionalities can be distributed among the modules in a different manner.

Specifically, FIG. 5 shows a diagrammatic representation of a machine in the example form of a computer system 500. The computer system 500 can be used to execute instructions 524 (e.g., program code modules) that cause the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a cloud server residing on a shared "virtualized" environment managed by a cloud hosting provider, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 500 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., program code modules) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any non-transitory medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for processing requests using shared memory, comprising:
   writing, by a first process, data associated with a request and an identifier referencing the data to a shared memory segment;
   transmitting, by the first process to a second process, the identifier referencing the data;
   comparing, by the second process, the transmitted identifier to the identifier in the shared memory segment; and
   responsive to the transmitted identifier matching the identifier in the shared memory segment, the second process:
      updating the identifier in the shared memory segment to indicate that the data has been retrieved by the second process;
      processing the data to generate a response; and
      transmitting the response to the first process.

2. The computer-implemented method of claim 1, further comprising responsive to the transmitted identifier not matching the identifier in the shared memory segment, the second process:
   terminating processing of the data from the shared memory segment.

3. The computer-implemented method of claim 1, wherein the comparing of the transmitted identifier to the identifier in the shared memory segment and the updating of the identifier in the shared memory segment comprise a single atomic operation.

4. The computer-implemented method of claim 1, further comprising, the first process:
   determining to reassign the data to a third process;
   comparing the transmitted identifier to the identifier in the shared memory segment; and
   responsive to the transmitted identifier matching the identifier in the shared memory segment, updating the identifier in the shared memory segment to indicate that the data has been reassigned.

5. The computer-implemented method of claim 4, wherein the determining to reassign the data to a third process comprises:
   determining that a time period for processes to process tasks has been exceeded.

6. The computer-implemented method of claim 4, wherein the shared memory segment is a first shared memory segment, the method further comprising responsive to the transmitted identifier matching the identifier in the shared memory segment, the first process:
   writing the data and an identifier referencing the data to a second shared memory segment; and
   transmitting, to a third process, the identifier written to the second shared memory segment.

7. The computer-implemented method of claim 4, further comprising responsive to the transmitted identifier not matching the identifier in the shared memory segment, by the first process:
   terminating an attempt to reassign the data in the shared memory segment.

8. A non-transitory computer-readable storage medium storing executable computer program instructions for dynamically creating a shared memory architecture, the computer program instructions comprising instructions for:
   writing, by a first process, data associated with a request and an identifier referencing the data to a shared memory segment;
   transmitting, by the first process to a second process, the identifier referencing the data;
   comparing, by the second process, the transmitted identifier to the identifier in the shared memory segment; and
   responsive to the transmitted identifier matching the identifier in the shared memory segment, the second process:
      updating the identifier in the shared memory segment to indicate that the data has been retrieved by the second process;
      processing the data to generate a response; and
      transmitting the response to the first process.

9. The non-transitory computer-readable storage medium of claim 8, the computer program instructions further comprising instructions for responsive to the transmitted identifier not matching the identifier in the shared memory segment, the second process:
   terminating processing of the data from the shared memory segment.

10. The non-transitory computer-readable storage medium of claim 8, wherein the comparing of the transmitted identifier to the identifier in the shared memory segment and the updating of the identifier in the shared memory segment comprise a single atomic operation.

11. The non-transitory computer-readable storage medium of claim 8, the computer program instructions further comprising instructions for the first process:
   determining to reassign the data to a third process;
   comparing the transmitted identifier to the identifier in the shared memory segment; and
   responsive to the transmitted identifier matching the identifier in the shared memory segment, updating the identifier in the shared memory segment to indicate that the data has been reassigned.

12. The non-transitory computer-readable storage medium of claim 11, wherein the determining to reassign the data to a third process comprises:
  determining that a time period for processes to process tasks has been exceeded.

13. The non-transitory computer-readable storage medium of claim 11, wherein the shared memory segment is a first shared memory segment, the computer program instructions further comprising instructions for responsive to the transmitted identifier matching the identifier in the shared memory segment, the first process:
  writing the data and an identifier referencing the data to a second shared memory segment; and
  transmitting, to a third process, the identifier written to the second shared memory segment.

14. The non-transitory computer-readable storage medium of claim 11, the computer program instructions further comprising instructions for responsive to the transmitted identifier not matching the identifier in the shared memory segment, by the first process:
  terminating an attempt to reassign the data in the shared memory segment.

15. A computer system comprising:
  a computer processor; and
  a non-transitory computer-readable storage medium storing executable computer program instructions that when executed by the computer processor perform actions comprising:
  writing, by a first process, data associated with a request and an identifier referencing the data to a shared memory segment;
  transmitting, by the first process to a second process, the identifier referencing the data;
  comparing, by the second process, the transmitted identifier to the identifier in the shared memory segment; and
  responsive to the transmitted identifier matching the identifier in the shared memory segment, the second process:
    updating the identifier in the shared memory segment to indicate that the data has been retrieved by the second process;
    processing the data to generate a response; and
    transmitting the response to the first process.

16. The computer system of claim 15, the actions further comprising responsive to the transmitted identifier not matching the identifier in the shared memory segment, the second process:
  terminating processing of the data from the shared memory segment.

17. The computer system of claim 15, wherein the comparing of the transmitted identifier to the identifier in the shared memory segment and the updating of the identifier in the shared memory segment comprise a single atomic operation.

18. The computer system of claim 15, the actions further comprising the first process:
  determining to reassign the data to a third process;
  comparing the transmitted identifier to the identifier in the shared memory segment; and
  responsive to the transmitted identifier matching the identifier in the shared memory segment, updating the identifier in the shared memory segment to indicate that the data has been reassigned.

19. The computer system of claim 18, wherein the determining to reassign the data to a third process comprises:
  determining that a time period for processes to process tasks has been exceeded.

20. The computer system of claim 18, wherein the shared memory segment is a first shared memory segment, the actions further comprising responsive to the transmitted identifier matching the identifier in the shared memory segment, the first process:
  writing the data and an identifier referencing the data to a second shared memory segment; and
  transmitting, to a third process, the identifier written to the second shared memory segment.

21. The computer-implemented method of claim 4, wherein the determining to reassign the data to a third process comprises:
  determining that a connection corresponding to the data has been disconnected.

22. The non-transitory computer-readable storage medium of claim 11, wherein the determining to reassign the data to a third process comprises:
  determining that a connection corresponding to the data has been disconnected.

23. The computer system of claim 18, wherein the determining to reassign the data to a third process comprises:
  determining that a connection corresponding to the data has been disconnected.

* * * * *